Patented Jan. 18, 1938

2,105,792

UNITED STATES PATENT OFFICE 2,105,792

UNSATURATED KETONES

Johannes Nelles, Leverkusen-Schlebusch, Germany, assignor to I. G. Farbenindustrie Aktiengesellschaft, Frankfort-on-the-Main, Germany No Drawing. Application June 22, 1936, Serial No. 86,693. In Germany June 29, 1935

5 Claims. (Cl. 260—134)

The present invention relates to new unsaturated ketones and to a process of preparing the same.

In accordance with this invention new unsaturated ketones are obtained which correspond to the following formula:—

$$CHX=CXCOCY=CHY$$

wherein one of the X's and one of the Y's stand for hydrogen and the other X and Y stand for hydrogen or alkyl. Amongst the alkyl groups there is preferably employed the methyl group. These new products represent unsaturated ketones. They are capable of being polymerized and are valuable intermediate products, for instance, for the preparation of artificial masses.

My new products can be prepared by causing acid halogenides of halogen containing aliphatic carboxylic acids containing at least three carbon atoms or of unsaturated aliphatic acids of at least three carbon atoms to react with ethylene or alkyl derivatives thereof and splitting off hydrogen halide from the condensation products thus formed. The first step of the reaction is preferably performed in the presence of such condensing agents as are employed for the so-called Friedel-Crafts' reaction. In case of employing alkyl derivatives of ethylene, such as propylene, as starting materials, the final products probably represent mixtures of isomeric compounds, for instance, of the corresponding propenyl- and isopropenyl ketones.

The following examples illustrate the invention, without however, restricting it thereto, the parts being by weight:—

Example 1

10 parts of beta-chloropropionic acid chloride are mixed with 11 parts of aluminium chloride while cooling and stirring and with simultaneous introduction of ethylene. As soon as the absorption of the ethylene has ceased, the mass is poured into aqueous hydrochloric acid to which ice is added. The liquid di-beta-chloroethyl-ketone of the boiling point of 73–75° C. at 12 mm. pressure separates for the greater part. A further quantity may be obtained by extraction with benzene from the aqueous solution. The ketone is then gradually poured while thoroughly stirring into three times the quantity of diethylaniline heated to 180° C. In this process hydrochloric acid is split off and the divinylketone is obtained in a good yield (boiling point 35° C. 50 mm.).

When replacing in the above example the ethylene by propylene, an intermediate product is obtained, which may be defined as the chloroethyl-chloropropylketone and has the boiling point of 85–90° C. at 12 mm. pressure. Hydrogen halide can be split up therefrom under the same conditions as described above. The resulting unsaturated ketone has the boiling point of 40–45° C. at 50 mm. pressure.

Example 2

13 parts of aluminium chloride are introduced into 9 parts of crotonic acid chloride while cooling and stirring with simultaneous introduction of propylene. After the reaction is finished the tough mass is decomposed with iced water and hydrochloric acid. After extraction of the aqueous solution with benzene the chloropropylpro-phenylketone of the boiling point of 50–55° C. at 12 mm. pressure is obtained in a good yield. This compound can be converted by splitting off hydrochloric acid, for example, by heating with diethylaniline, into dipropenyl-ketone of boiling point of 55° C. at 51 mm. pressure.

I claim:—

1. The products of the formula:—

$$CHX=CXCOCY=CHY$$

wherein one of the X's and one of the Y's stand for hydrogen and the other X and Y stand for a member of the group consisting of hydrogen and alkyl radicals.

2. The products of the formula:—

$$CHX=CXCOCY=CHY$$

wherein one of the X's and one of the Y's stand for hydrogen and the other X and Y stand for a member of the group consisting of hydrogen and a methyl radical.

3. The divinylketone.

4. The process which comprises causing a member of the group consisting of acid halogenides of halogen containing aliphatic carboxylic acids of at least 3 carbon atoms and of unsaturated aliphatic acids of at least 3 carbon atoms to react with an olefine selected from the group consisting of ethylene and alkyl derivatives thereof and splitting off hydrogen halide from the condensation products formed thereby.

5. The process as claimed in claim 4, wherein the first step of the reaction is performed in the presence of Friedel-Crafts' catalysts.

JOHANNES NELLES.